United States Patent [19]

Uchida et al.

[11] Patent Number: 4,869,515
[45] Date of Patent: Sep. 26, 1989

[54] METAL PLATE WITH REINFORCED BEADS FOR A METAL GASKET

[75] Inventors: Tatsuro Uchida, Matsudo; Yoshio Yamada, Koshigaya, both of Japan

[73] Assignee: Ishikawa Gasket Co., Ltd., Tokyo, Japan

[21] Appl. No.: 295,860

[22] Filed: Jan. 11, 1989

[30] Foreign Application Priority Data

Feb. 19, 1988 [JP] Japan ............................. 63-20826[U]

[51] Int. Cl.4 .............................................. F16J 15/08
[52] U.S. Cl. .................. 277/207 R; 277/213; 277/235 B; 277/236
[58] Field of Search ............... 277/207 R, 235 B, 236, 277/213; 428/183, 174; 220/72

[56] References Cited

U.S. PATENT DOCUMENTS 2,991,774  7/1961  Rarey ................................. 277/236

FOREIGN PATENT DOCUMENTS 697854  9/1953  United Kingdom ............ 277/235 B

Primary Examiner—Alan N. Shoap
Attorney, Agent, or Firm—Kanesaka and Takeuchi

[57] ABSTRACT

A metal plate of the invention is used for a metal gasket. The metal plate comprises a base plate, at least one first bead to surround an area to be sealed, and at least one second bead extending from the first bead. An intersecting portion is formed between the first and second beads. The intersecting portion is provided with a depression extending from a side of a non-high pressure area toward an inside of the intersecting portion to reduce the size of the intersecting portion. As a result, the intersecting portion of the first and second beads can provide surface pressure at least substantially equal to the rest of the portions of the first and second beads without affecting the sealing ability at a high pressure area when the beads are compressed.

5 Claims, 1 Drawing Sheet

METAL PLATE WITH REINFORCED BEADS FOR A METAL GASKET

BACKGROUND OF THE INVENTION AND RELATED ART STATEMENT

The present invention relates to a metal plate having reinforced beads for a metal gasket.

An internal combustion engine is provided with a plurality of holes therein, such as cylinder holes, water holes, oil holes, push rod holes, and so on. Some of the holes must be securely sealed therearound to prevent fluid from leaking from the holes. Therefore, a gasket to be installed between two engine blocks must have good sealing ability around the holes of the engine.

A steel laminate gasket is formed of a plurality of steel plates. In order to securely seal around the holes of the engine, it is conventional that at least one of the metal plates of a steel laminate gasket is provided with beads around portions to be sealed. When the steel laminate gasket is tightened, the steel laminate gasket with beads as stated above operates fine as intended.

In a steel laminate gasket, sometimes, areas to be sealed are located very close to each other. In this situation, it is impossible to separately or independently form beads, so that adjacent beads are combined and a common portion of the beads is deleted. In some situations, also, one side of a sealing area is sealed by one bead, while the other sides are sealed by two beads, wherein two beads extend from one bead. Namely, in some situations, beads intersect with each other and an intersecting portion is formed.

When two beads intersect, an area of the intersecting portion of the two beads becomes large. Namely, a wide bead portion is formed at the intersecting portion. Therefore, when the steel plate with the intersecting portion of the beads is compressed, the intersecting portion of the beads shows a surface pressure weaker than the rest of the beads. When high pressure is applied, it is liable to leak at a weak surface pressure portion. As a result, a steel laminate gasket having a steel plate with an intersecting portion of the beads is not suitable for an engine requiring high sealing pressure.

Similarly, in case a metal gasket is formed of one metal plate, which is provided with an intersecting portion of beads, the intersecting portion becomes large. As a result, when the metal plate is compressed, the surface pressure at the intersecting portion of the beads becomes weaker than that at the rest of the beads. The metal gasket is, therefore, liable to cause leakage.

In this respect, Japanese Patent Publication (KOKAI) No. 58-149467 discloses that in case two beads intersect, the width of one bead is gradually reduced at the intersecting portion to thereby strengthen the intersecting portion. This structure is fine as long as no high pressure is applied to the reduced portion of the bead at the intersecting portion.

However, this sealing structure is not suitable in case high pressure is applied to the reduced portion of the bead. This is because the sealing ability is reduced if high pressure is applied to the reduced portion of the bead. A high pressure side of a bead must have a smooth surface.

Accordingly, one object of the present invention is to provide a metal plate for a metal gasket, which can provide high surface pressure throughout the entire bead, when compressed.

Another object of the present invention is to provide a steel plate as stated above, in which an intersecting portion of the beads has strength substantially equal to or stronger than the rest of the beads.

A further object of the present invention is to provide a steel plate as stated above, which can securely seal around a high pressure area.

A still further object of the present invention is to provide a steel plate as stated above, which can be used as one of metal plates of a steel laminate gasket.

Further objects and advantages of the present invention will be apparent from the following description of the invention.

SUMMARY OF THE INVENTION

In accordance with the present invention, a metal plate is used for a metal gasket to be installed between two engine blocks of an internal combustion engine. The metal plate of the invention may be used as one of metal plates of a steel laminate gasket.

The metal plate comprises a base plate, at least one first and second beads formed on the base plate, and an intersecting portion between the first and second beads. The base plate includes a high pressure area and a non-high pressure area. The first bead is formed around the high pressure area to separate the same from the non-high pressure area.

The intersecting portion is provided with a depression extending from a side of the non-high pressure area into the inside of the intersecting portion. As a result, the intersecting portion of the first and second beads can provide surface pressure substantially equal to or stronger than that at the portions of the first and second beads other than the intersecting portion without affecting the sealing ability at the high pressure area when the beads are compressed.

When a plurality of high pressure areas is formed adjacent to each other, the first bead surrounds outside the high pressure areas to divide from the non-high pressure area. The second bead is situated inside the first bead to separate the respective high pressure areas. The depression extends toward the second bead from the non-high pressure area.

DETAILED DESCRIPTION OF PREFERRED EMBODIMENTS

Figure 1:
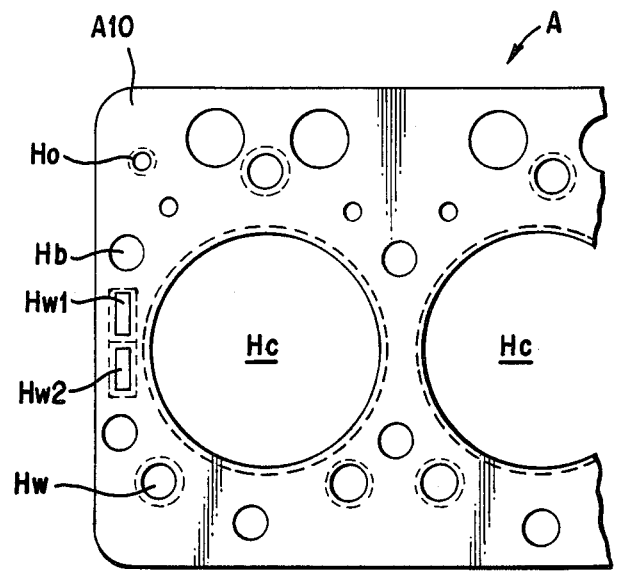
FIG. 1 is a partial plan view of a first embodiment of a steel plate of the present invention.
Figure 2:
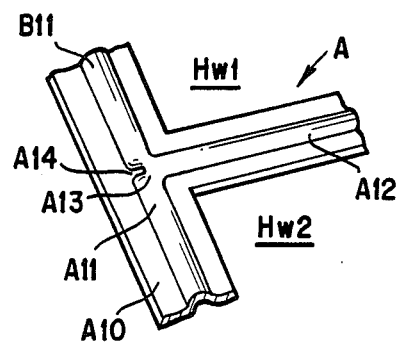
FIG. 2 is an enlarged partial perspective view of an intersecting portion of two beads as shown in FIG. 1.

Referring to FIGS. 1 and 2, a first embodiment A of a steel plate in accordance with the present invention is shown. The steel plate A is provided with cylinder holes Hc, water holes Hw, Hw1 and Hw2, oil holes Ho, bolt holes Hb and so on. The water holes Hw1, Hw2 are located adjacent to each other. Beads are formed around the cylinder holes Hc, water holes Hw, Hw1 and Hw2, and oil holes Ho. In FIG. 1, the beads are indicated in dot lines.

As shown in FIGS. 1 and 2, the water holes Hw1, Hw2 are formed on a plate A10, and are arranged close to each other. The outside of the water holes Hw1, Hw2 are surrounded by a bead A11, and the water holes Hw1, Hw2 are divided by a bead A12. An intersecting portion A13 is formed at a portion where the beads A11, A12 intersects.

At the intersecting portion A13, a depression A14 extending from an outer side of the plate A10 toward the bead A12 is formed. Since the depression A14 is formed at the intersecting portion A13, the occupied area of the intersecting portion A13 is significantly reduced. As a result, when the plate A10 is compressed, the surface pressure at the intersecting portion A13 becomes substantially equal to that at the beads A11, A12. Therefore, the area around the water holes Hw1, Hw2 is securely sealed.

In this respect, if the depression A14 is not formed at the intersecting portion A13, the area of the intersecting portion A13 is relatively large. Consequently, when the plate A10 is compressed, the surface pressure at the intersecting portion A13 is different from that at the beads A11, A12. In practice, the surface pressure at the intersecting portion A13 is weaker than that at the beads A11, A12. If high pressure is applied to the beads A11, A12 without the depression A14, it is liable to leak at the low surface pressure portion, i.e. an intersecting portion of the beads.

The intersecting portion A13 with the depression A14 provides surface pressure substantially equal to the surface pressure at other portions of the beads A11, A12 when the plate A10 is compressed. However, the intersecting portion A13 may provide surface pressure stronger than that at other portions of the beads A11, A12 as long as the intersecting portion A13 has flexibility or elasticity.

Namely, even if the intersection portion A13 is stronger in rigidity than other portions of the beads A11, A12, very strong tightening pressure is applied to the entire beads A11, A12 including the intersecting portion A13 when the engine blocks are tightened. In this situation, the intersecting portion A13 as well as other portions of the beads A11, A12 are compressed equally at high pressure, though the surface pressure at the beads is not even. The tightening pressure is determined based on the compression force applied to the beads A11, A12, not the intersecting portion of the beads. Therefore, even if the intersecting portion provides strong surface pressure, it does not affect the sealing ability of the beads.

The intersecting portion must provide surface pressure substantially equal to or stronger than the surface pressure of the beads other than the intersecting portion. Otherwise, when high pressure is applied to the beads, leakage may occur at a weak surface pressure portion.

In the present invention, high pressure is applied to the water hole, Hw1, Hw2. In particular, high pressure is applied to the water hole side of the bead A11, but no pressure is applied to the outer side of the bead A11 or the side opposite to the water hole side. Therefore, in the present invention, no processing is made at the water hole side of the bead A11, and the depression A14 is formed at the outer side of the bead A11. A high pressure side or the water hole side of the bead A11 must have a smooth surface to prevent leakage of fluid. If high pressure side has a depression, high pressure is applied to the depression, and causes leakage there at.

Figure 3:
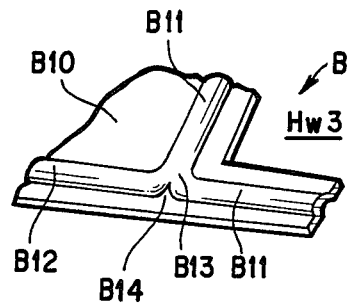
FIG. 3 is a partial perspective view, similar to FIG. 2, for showing a second embodiment of the present invention.

FIG. 3 show a second embodiment B of a steel plate of the present invention. The plate B10 is provided with a water hole Hw3, a bead B11 extending around the water hole Hw3, and a bead B12 extending from the bead B11. A depression B14 is formed at an intersecting portion B13 of the beads B11, B12 to extend from a non-high pressure side. The size of the depression B14 is smaller than that of the depression A14. However, the plate B operates as in the plate A.

In the present invention, the shape had size of the depression are determined by the shape and size of the intersecting portion of the beads. The beads need not intersect in the T-shape as shown in the drawings. The beads may cross over or acutely intersect with each other. Also, the beads intersecting with each other may have different width.

In the present invention, a depression must be formed at an intersecting portion of beads to extend from non-high pressure side of the beads to reduce the size of the intersecting portion. Preferably, the high pressure side of the bead has a smooth surface. As a result, the intersecting portion of the beads can possess the surface pressure substantially the same as or stronger than the rest of the beads when the beads are compressed.

The metal plate of the invention can be used as a gasket by itself. Also, in case the metal plate of the invention is combined with other metal plates to form a steel laminate gasket, the gasket can provide sufficient surface pressure when compressed. Even if high pressure is applied to the gasket in use, leakage is substantially prevented.

While the invention has been explained with reference to the specific embodiments of the invention, the explanation is illustrative and the invention is limited only by the appended claims.

What is claimed is:

1. A metal plate for a metal gasket, comprising:
    a base plate having at least one high pressure area to be sealed, and non-high pressure areas,
    at least one first bead formed on the base plate around the high pressure area for sealing therearound so that the first bead divides the high pressure area from the non-high pressure area,
    at least one second bead extending from the first bead, and
    an intersecting portion formed between the first and second beads, said intersecting portion having a depression extending from a side of the non-high pressure area into an inside of the intersecting portion so that the intersecting portion of the first and second beads can provide surface pressure at least substantially equal to the portions of the first and second beads other than the intersecting portion without affecting the sealing ability at the high pressure area when the first and second beads are compressed.

2. A metal plate according to claim 1, wherein the first bead is provided with a smooth inner side at a side facing the high pressure area.

3. A metal plate according to claim 2, wherein a plurality of high pressure areas is formed on the base plate to be arranged adjacent to each other, said first bead surrounding outside the high pressure areas to divide from the non-high pressure area, said second bead being situated inside the first bead to separate the respective high pressure areas 4. A metal plate according to claim 3, wherein said depression extends toward the second bead from the non-high pressure area.

5. A metal plate according to claim 4, wherein said depression is in the form of a V-shape.

\* \* \* \* \*